(12) United States Patent
Gillig et al.

(10) Patent No.: US 11,164,735 B2
(45) Date of Patent: Nov. 2, 2021

(54) ION MIGRATION RATE ANALYSIS DEVICE AND ANALYSIS METHOD APPLIED

(71) Applicant: SHIMADZU RESEARCH LABORATORY(SHANGHAI) CO., LTD., Shanghai (CN)

(72) Inventors: Kent James Gillig, Shanghai (CN); Keke Wang, Shanghai (CN); Wenjian Sun, Shanghai (CN); Xiaoqiang Zhang, Shanghai (CN); Yupeng Cheng, Shanghai (CN)

(73) Assignee: SHIMADZU RESEARCH LABORATORY (SHANGHAI) CO., LTD., Shanghai (CN)

( * ) Notice: Subject to any disclaimer, the term of this patent is extended or adjusted under 35 U.S.C. 154(b) by 216 days.

(21) Appl. No.: 16/321,108

(22) PCT Filed: Jun. 15, 2018

(86) PCT No.: PCT/CN2018/091605
§ 371 (c)(1),
(2) Date: Jan. 28, 2019

(87) PCT Pub. No.: WO2018/224050
PCT Pub. Date: Dec. 13, 2018

(65) Prior Publication Data
US 2019/0164737 A1    May 30, 2019

(30) Foreign Application Priority Data
Jun. 6, 2017  (CN) .......................... 201710419686.1

(51) Int. Cl.
*H01J 49/06* (2006.01)
*H01J 49/26* (2006.01)
(Continued)

(52) U.S. Cl.
CPC ............ *H01J 49/063* (2013.01); *G01N 27/62* (2013.01); *G01N 27/624* (2013.01); *H01J 49/26* (2013.01)

(58) Field of Classification Search
CPC .......... H01J 49/00; H01J 49/02; H01J 49/025; H01J 49/04; H01J 49/06; H01J 49/062;
(Continued)

(56) References Cited

U.S. PATENT DOCUMENTS 5,847,386 A * 12/1998 Thomson .............. H01J 49/005
250/288
6,630,662 B1  10/2003 Loboda
(Continued)

FOREIGN PATENT DOCUMENTS

CN    101738429 A    6/2010

OTHER PUBLICATIONS

Zeleny, John, B.SC.,"VI. On the ratio of the velocities of th two ions produced in gases by Rontgen Radiation; and on some related phenomena", Philosophical Magazine Series 5, 46:278, 120-154.
(Continued)

*Primary Examiner* — Anastasia Midkiff
(74) *Attorney, Agent, or Firm* — Locke Lord LLP; Tim Tingkang Xia, Esq.

(57) ABSTRACT

The invention provides an ion mobility analyzer apparatus and analysis method. The analyzer apparatus includes an ion source, two groups of parallel electrodes, a power supply unit and a detector. The drift region is formed between the two groups of parallel electrodes, and has an ion entrance connected to the ion source and an ion exit. Each group of parallel electrodes is located in a plane respectively, and the two planes are parallel to each other. The power supply unit is configured to apply direct current potentials on the two groups of parallel electrodes to form a direct current electric
(Continued)

field that applies an opposing force on ions against the gas flow so that ions with different mobilities are trapped under the combined effect of the gas flow and the direct current electric field. The detector is connected to the ion exit to detect ions.

15 Claims, 10 Drawing Sheets

(51) Int. Cl.
*G01N 27/624* (2021.01)
*G01N 27/62* (2021.01)

(58) Field of Classification Search
CPC .......... H01J 49/063; H01J 49/22; H01J 49/26; H01J 49/34; H01J 49/36; H01J 49/40; H01J 49/401; H01J 49/42; H01J 49/4205; H01J 49/422; H01J 49/4225; H01J 49/4255; H01J 49/426; H01J 49/4265; H01J 49/427; H01J 49/4285; H01J 49/429; G01N 27/00; G01N 27/62; G01N 27/622; G01N 27/624
See application file for complete search history.

(56) References Cited

U.S. PATENT DOCUMENTS

| | | | |
|---|---|---|---|
| 7,838,826 B1 | 11/2010 | Park | |
| 8,809,769 B2* | 8/2014 | Park | H01J 49/004 250/281 |
| 8,835,839 B1* | 9/2014 | Anderson | H01J 49/06 250/290 |
| 9,063,086 B1* | 6/2015 | Garimella | G01N 27/622 |
| 9,324,552 B2 | 4/2016 | Gillig et al. | |
| 2002/0175279 A1* | 11/2002 | Hager | H01J 49/4225 250/282 |
| 2006/0108520 A1* | 5/2006 | Park | H01J 49/107 250/287 |

OTHER PUBLICATIONS

Laiko, Victor V.,"Orthogonal Extract Ion Mobility Spectrometry", Journal of American Society of Mass Spectrometry, 2006, 17, 500-507.
State Intellectual Property Office of the P.R. China (ISR/SIPO), "International Search Report for PCT/CN2018/091605", NL, dated Sep. 27, 2018.

* cited by examiner

ION MIGRATION RATE ANALYSIS DEVICE AND ANALYSIS METHOD APPLIED

FIELD OF THE INVENTION

The present invention relates to the technical field of ion mobility analysis, and in particular to an ion mobility analyzer apparatus and an analysis method thereof.

BACKGROUND OF THE INVENTION

Ion mobility can be measured in two manners. One is to measure the speed of ions in an electric field and a static gas, and the other is to measure a distance that ions move in a vertical electric field and a gas flow. The resolution and sensitivity of the two types of ion mobility spectrometers are limited by diffusion. The resolution of a traditional time-of-flight ion mobility spectrometer can be increased by increasing the length of a drift tube and electric field, while the impact of diffusion on the resolution can be reduced by adding radial electric fields (radio frequency ion funnels, radio frequency quadrupole fields, and direct current periodic electrostatic fields). The time-of-flight ion mobility spectrometer can acquire an entire ion mobility spectrum in a short period of time. Resolution higher than 100 can be achieved in few milliseconds. The main disadvantage is that the duty cycle decreases as the resolution is increased.

To further increase the resolution of the ion mobility spectrometer, the gas flow direction and the electric field direction can oppose each other as described by Zeleny in the parallel flow analyzer (Zeleny, J. *Philos. Mag.* 46, 120(1898)). Zeleny's analyzer consists of two parallel grids for balancing ions between opposing forces of the gas flow and the electric field. Laiko improved Zeleny's apparatus (Laiko, Victor V. *Journal of The American Society for Mass Spectrometry* 17.4(2006):500-507). Laiko's analyzer consists of a nonlinear electric field opposing a gas flow to separate ions with different ion mobilities under the combined effect of the electric field and the gas flow. However, Laiko's apparatus worked at atmospheric pressure without radial forces present to reduce diffusion, and the experiment result was not desirable. Many other attempts have been made to achieve a parallel flow analyzer, including Loboda's segmented quadrupole field with an opposing gas flow (U.S. Pat. No. 6,630,662B1), Gillig's direct current periodic focusing differential mobility spectrometer (PFDMA) (U.S. Pat. No. 9,324,552B2), and Parks parallel flow ion mobility spectrometer/trapped ion mobility spectrometer (U.S. Pat. No. 7,838,826B1). Experimentally, the only successful apparatuses have resulted from the apparatuses of Loboda and Park, and Gillig's PFDMA. Loboda and Park both used radio frequency electric fields to trap ions radially in the presence of a low pressure gas flow. Park used a nonlinear electric field to pre-separate ions based on ion mobilities followed by a slowly decreasing electric field so that ions with different mobilities pass through the analyzer slowly and sequentially (as illustrated in FIG. 1). Loboda used a slowly increasing uniform electric field to drive ions to pass through the analyzer against the gas flow. Gillig used a combination of electric fields opposing and orthogonal to a gas flow to drive ions against the gas flow to a detector. Park used higher gas pressure than Loboda to achieve higher resolution but his device has three disadvantages: long dwell time when not in use; a limited number of ions of a particular ion mobility can be trapped per analysis resulting in low sensitivity and low duty cycle; and the drift gas of the apparatus is limited to air, and hence the measured mobility is not accurate.

Therefore, there exists a need for a high resolution ion mobility spectrometry analyzer that can achieve high sensitivity and ion utilization while measuring the ion mobility accurately.

SUMMARY OF THE INVENTION

In view of the above disadvantages of the prior art, an object of the present invention is to provide an ion mobility analyzer apparatus and analysis method thereof, so as to resolve the problems in the prior art.

In order to accomplish the above and other related objects, the present invention provides an ion mobility analyzer apparatus for separating and identifying ionic analytes. The ion mobility analyzer apparatus comprises: an ion source; two groups of parallel electrodes, wherein a drift region is formed between the two groups of parallel electrodes, the drift region has an ion entrance and an ion exit, wherein the ion entrance is connected to the ion source; wherein each of the two groups of parallel electrodes is located in a plane respectively, the two planes are parallel to each other; and a gas flow exists in the drift region, the gas flow is a laminar flow; a power supply unit, applying direct current voltage on the two groups of parallel electrodes to form a direct current electric field that applies an opposing force on ions against the gas flow, so that ions with different mobilities are trapped under the combined effect of the gas flow and the direct current electric field, wherein the power supply unit scans the direct current electric field to separate ions with different mobilities in the drift region; and the power supply unit add radio frequency voltages on the parallel electrodes to confine ions in a direction perpendicular to the direction of the gas flow; and a detector connected to the ion exit to detect ions.

In an embodiment of the present invention, each group of parallel electrodes comprises a series of parallel strip electrodes, a direction of the strip electrodes is perpendicular to the direction of the gas flow, and radio frequency voltages with different phases are applied on adjacent strip electrodes to form, in the direction perpendicular to the direction of the gas flow, a quadrupole field array or multipole field array for confining ions.

In an embodiment of the present invention, each group of parallel electrodes comprises a series of parallel strip electrodes, a direction of the strip electrodes is parallel to the direction of the gas flow, and radio frequency voltages with different phases are applied on adjacent strip electrodes to form, in a direction parallel to the gas flow, a quadrupole field array or multipole field array for confining ions.

In an embodiment of the present invention, a preset-length segment close to the ion exit of the drift region is provided with a series of electrodes, and radio frequency voltages are applied on the series of electrodes in the preset-length segment to form a focusing electric field to confine ions, focus ions, and transfer ions to the detector.

In an embodiment of the present invention, the ion source is located upstream of the gas flow, and the detector is located downstream of the gas flow.

In an embodiment of the present invention, the ion source is located downstream of the gas flow, and the detector is located upstream of the gas flow.

In an embodiment of the present invention, the ion source and the detector are located on two sides of a particular position in the gas flow.

In an embodiment of the present invention, a mass spectrometer is provided in a pre-stage and/or a post-stage of the drift region to form a mobility and mass-to-charge ratio hybrid analyzer with the ion mobility analysis apparatus.

In an embodiment of the present invention, the power supply unit applies a nonlinear electric field opposite to the direction of the gas flow on a part of electrodes close to the ion entrance in the drift region to accumulate ions near the ion source.

In an embodiment of the present invention, the direct current electric field in the drift region comprises a nonlinear direct current electric field to trap ions with different mobilities; and the power supply unit scans the nonlinear direct current electric field with time, and the trapped ions with different mobilities pass through the drift region in different periods of drift time to the detector.

In an embodiment of the present invention, the direct current electric field in the drift region comprises a nonlinear direct current electric field to transfer all ions from the ion entrance to an end of the drift region and accumulate the ions at the end; and the power supply unit scans the nonlinear direct current electric field with time, and the accumulated ions with different mobilities pass through the drift region in different periods of drift time to the detector.

In an embodiment of the present invention, the direct current electric field comprises a nonlinear direct current electric field to confine all ions near an axis, which is perpendicular to the direction of the gas flow, from the ion source to the detector; and the power supply unit applies a direct current gradient on at least part of the two groups of parallel electrodes perpendicular to the direction of the gas flow, and pushes all ions to move from the ion entrance to the ion exit along the direction perpendicular to the direction of the gas flow.

In an embodiment of the present invention, velocity of the gas flow in the drift region is scanned with time, ions with different mobilities pass through the drift region in different periods of drift time to the detector.

In order to accomplish the above and other related objects, the present invention provides an analysis method for separating and identifying ionic analytes, comprising: providing an ion source; providing two groups of parallel electrodes, wherein a drift region is formed between the two groups of parallel electrodes, the drift region has an ion entrance and an ion exit, and the ion entrance is connected to the ion source, wherein each group of the two groups of electrodes is located in a plane respectively, the two planes are parallel to each other, and a gas flow exists in the drift region, the gas flow is a laminar flow; providing a power supply unit, applying direct current voltage on the two groups of parallel electrodes to form a direct current electric field that applies an opposing force on ions against the gas flow, so that ions with different mobilities are trapped under the combined effect of the gas flow and the direct current electric field, wherein the power supply unit scans the direct current electric field to separate ions with different mobilities in the drift region; and the power supply unit adds radio frequency voltages on the parallel electrodes to confine ions in a direction perpendicular to the direction of the gas flow; and providing a detector connected to the ion exit to detect ions.

In an embodiment of the present invention, the direct current electric field in the drift region comprises a nonlinear direct current electric field, and the method comprises: trapping ions with different mobilities by using the nonlinear direct current electric field; and scanning the nonlinear direct current electric field over time, so that the trapped ions with different mobilities pass through the drift region in different periods of drift time to reach the detector.

In an embodiment of the present invention, the direct current electric field in the drift region comprises a nonlinear direct current electric field, and the method comprises: transferring all ions from the ion entrance to an end of the drift region by using the nonlinear direct current electric field, and accumulating the ions at the end; and scanning the nonlinear direct current electric field with time, and the accumulated ions with different mobilities pass through the drift region in different periods of drift time to the detector.

In an embodiment of the present invention, the direct current electric field comprises a nonlinear direct current electric field, and the method comprises: confining all ions near an axis, which is perpendicular to the direction of the gas flow, from the ion source to the detector; and applying a direct current gradient perpendicular to the direction of the gas flow on at least part of the two groups of parallel electrodes, pushing all ions to move from the ion entrance to the ion exit along the direction perpendicular to the direction of the gas flow.

In an embodiment of the present invention, the analysis method comprises: scanning velocity of the gas flow in the drift region with time, and ions with different mobilities pass through the drift region in different periods of drift time to the detector.

As described above, the present invention provides an ion mobility analyzer apparatus and analysis method. The analyzer apparatus comprises: an ion source; two groups of parallel electrodes, wherein a drift region is formed between the two groups of parallel electrodes, the drift region has an ion entrance and an ion exit, and the ion entrance is connected to the ion source, wherein each of the two groups of parallel electrodes are located in a plane respectively, the two planes are parallel to each other, and a gas flow exists in the drift region, the gas flow is a laminar flow; a power supply unit, configured to apply direct current potentials on the two groups of parallel electrodes to form a direct current electric field that applies an opposing force on ions against the gas flow so that ions with different mobilities are trapped under the combined effect of the gas flow and the direct current electric field, wherein the power supply unit scans the direct current electric field to separate ions with different mobilities in the drift region, and the power supply unit adds radio frequency voltages on the parallel electrodes to confine ions in a direction perpendicular to the gas flow; and a detector connected to the ion exit to detect ions. The analyzer apparatus consistent with the present invention achieves high sensitivity and ion utilization, and can measure ion mobility accurately.

DETAILED DESCRIPTION OF THE INVENTION

Implementation modes of the present invention are illustrated below through specific embodiments. Those skilled in the art can easily understand other advantages and efficacies of the present invention according to the content disclosed in this specification.

It should be noted that the structures, scales, sizes and the like drawn in the accompanying drawings of this specification are all merely used to cooperate with the content disclosed in the specification so as to help those skilled in the art understand and read the content, but are not used to define limiting conditions for implementing the present invention and therefore do not have any substantial technical meanings. Any modifications on the structures, changes in the scale relations or adjustment in the sizes that do not affect the efficacies and objects of the present invention should still fall within the scope covered by the technical content disclosed by the present invention. Meanwhile, terms such as "upper", "lower", "left", "right", "middle" and "one" mentioned in this specification are merely used for the clarity of the description, and are not intended to limit the implementation scope of the present invention. Changes or adjustments in relative relations thereof without changing the technical content substantially should also be considered as the implementation scope of the present invention.

The present invention provides a technical solution for separating and identifying ions, molecules and particles. Specifically, the present invention provides an apparatus and a method for separating and analyzing ions based on ion mobility under the combined effect of an electric field and a gas flow on ions. In the present invention, ions can be separated and analyzed by scanning the electric field or by scanning the gas flow; wherein a planar structure in the present invention provides high ion capacity, so that the apparatus achieves high resolution while with high sensitivity and ion utilization.

Figure 1:
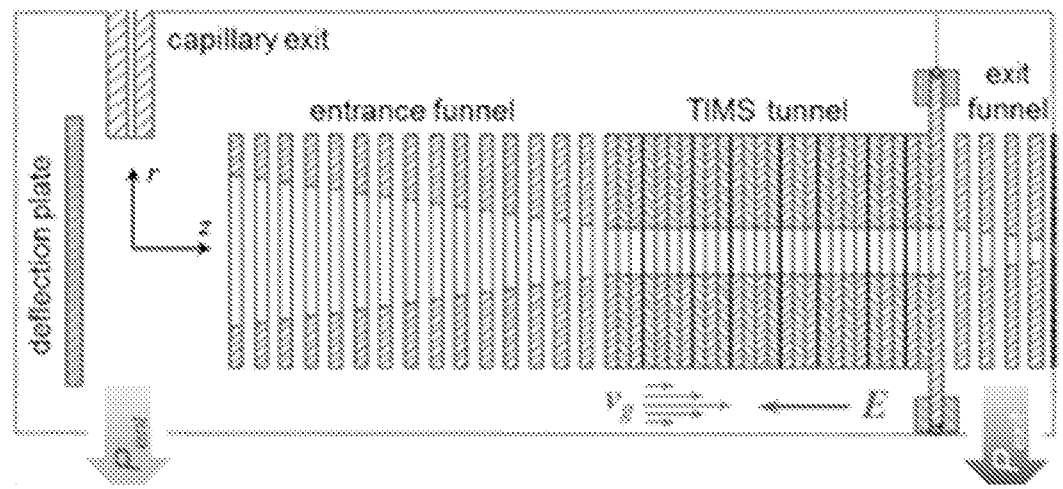
FIG. 1 is a schematic diagram of a trapped ion mobility analyzer based on Park's patent in the prior art.
Figure 2A:
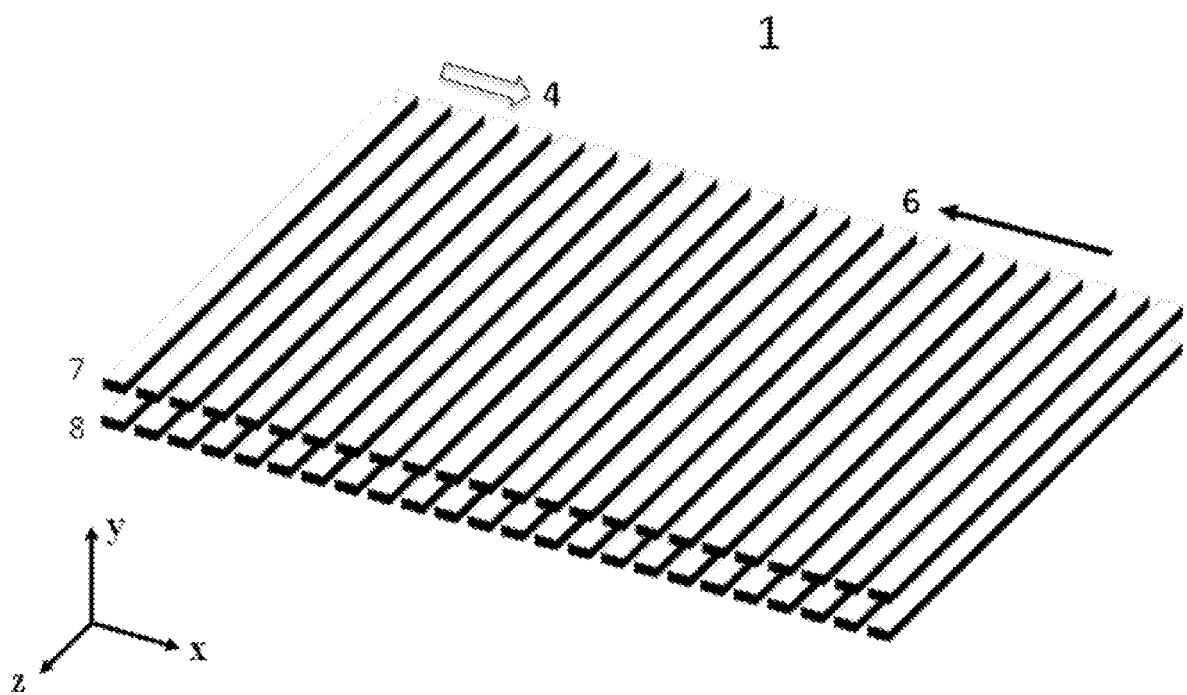
FIG. 2A is a first schematic structural diagram of an ion mobility analyzer apparatus in an embodiment of the present invention.

FIG. 2A is a schematic structural diagram of an embodiment of an ion mobility analyzer apparatus 1 consistent with the present invention. The ion mobility analyzer apparatus 1 comprises two groups of electrodes parallel to each other, that is, electrode assemblies 7 and 8. The electrode assembly 7 and electrode assembly 8 respectively comprise a plurality of strip electrodes, and the strip electrodes in the electrode assembly 7 and the electrode assembly 8 are disposed in pairs in a one-to-one manner and are arranged along an axial direction of ion transfer. A drift region is formed between the electrode assembly 7 and the electrode assembly 8. A gas flow 4 exists in the drift region. The gas flow is a laminar flow. Planes where the parallel electrode assemblies 7 and 8 are respectively located are parallel to each other.

A power supply unit applies direct current voltage on the parallel electrode assemblies 7 and 8 to form a direct current electric field 6 in the drift region. The direct current electric field 6 can be linear or nonlinear and applies an opposing force on ions against the gas flow 4, as can be seen from the arrow in the figure.

In addition, the power supply unit can further add radio frequency voltages with different phases on adjacent electrodes in the electrode assemblies 7 and 8 to form, in a direction perpendicular to a direction of the gas flow 4, a quadrupole field or multipole field for confining ions.

Figure 2B:
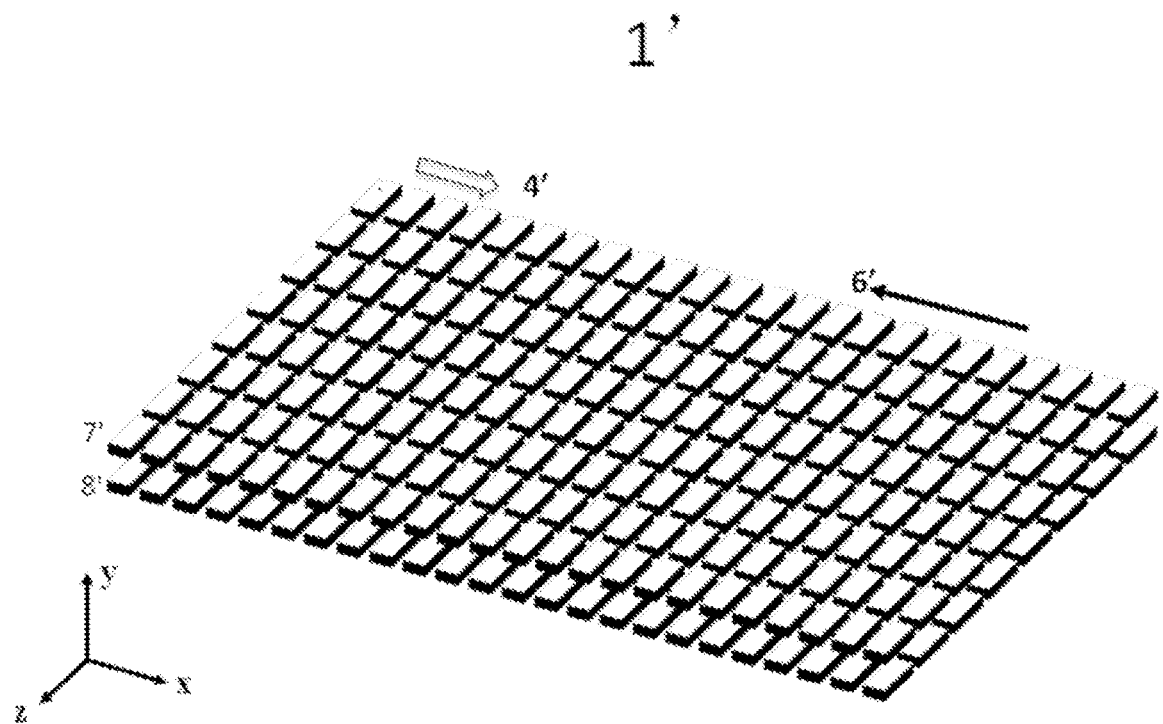
FIG. 2B is a second schematic structural diagram of an ion mobility analyzer apparatus in an embodiment of the present invention.

FIG. 2B is another schematic structural diagram of an ion mobility analyzer apparatus 1' consistent with the present invention. The difference between this structure and the structure shown in FIG. 2A is that electrodes in two electrode assemblies 7' and 8' are segmented in a direction perpendicular to an axial direction of ion transfer. Radio frequency voltages with different phases are applied on adjacent electrodes to form, in a direction parallel to the gas flow 4', a quadrupole field or multipole field for confining ions. The quadrupole field or multipole field of this form does not have radio frequency interference in an ion movement direction and does not affect resolution of the apparatus. Direct current voltages are applied on the electrode assemblies to form a linear or nonlinear direct current electric field 6' that applies an opposing force on ions against the gas flow.

Figure 2C:
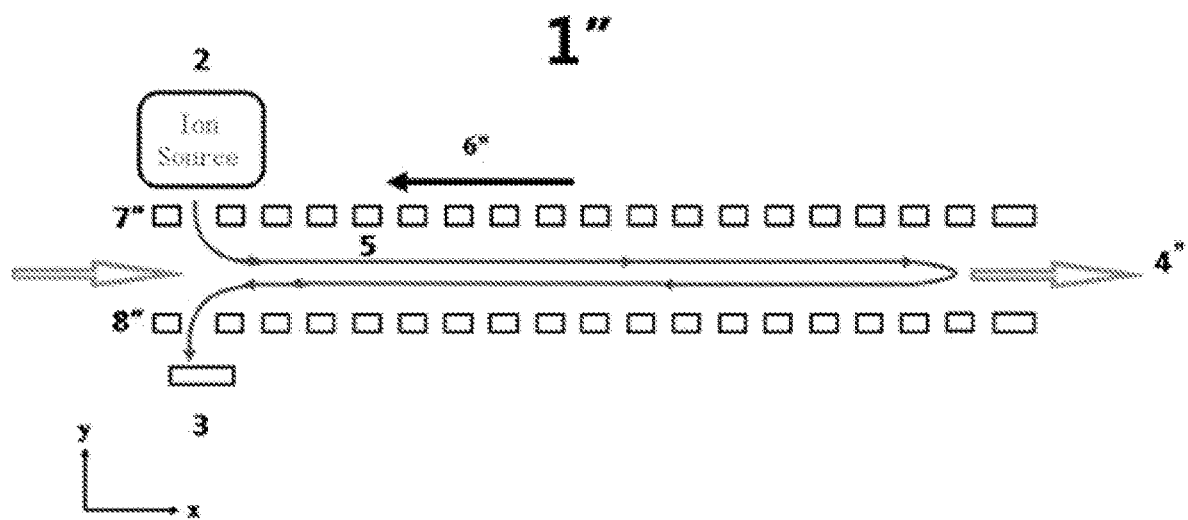
FIG. 2C is a cross sectional diagram of an xy plane of the ion mobility analyzer apparatus in FIG. 2A or FIG. 2B.

FIG. 2C is a cross sectional diagram of an xy plane of the ion mobility analyzer apparatus 1" in the embodiment of FIG. 2A or FIG. 2B of the present invention. An ion source 2 is located outside the entrance of the ion mobility analyzer apparatus. Two electrode assemblies 7" and 8" form a drift region as a mobility analyzer. A gas flow 4" exits in the drift region. The gas flow is a laminar flow. Planes where the electrode assemblies 7" and 8" are located are parallel to each other. Direct current voltages are applied on the electrode assemblies 7" and 8" to form a linear or nonlinear direct current electric field 6" that applies an opposing force on ions against the gas flow 4". In addition, radio frequency voltages are added on the electrode assemblies 7" and 8" to form a radio frequency electric field to confine ions. Ions pass through the drift region to the detector 3 along an ion trajectory 5 under the combined effect of the electric field and the gas flow.

Figure 3:
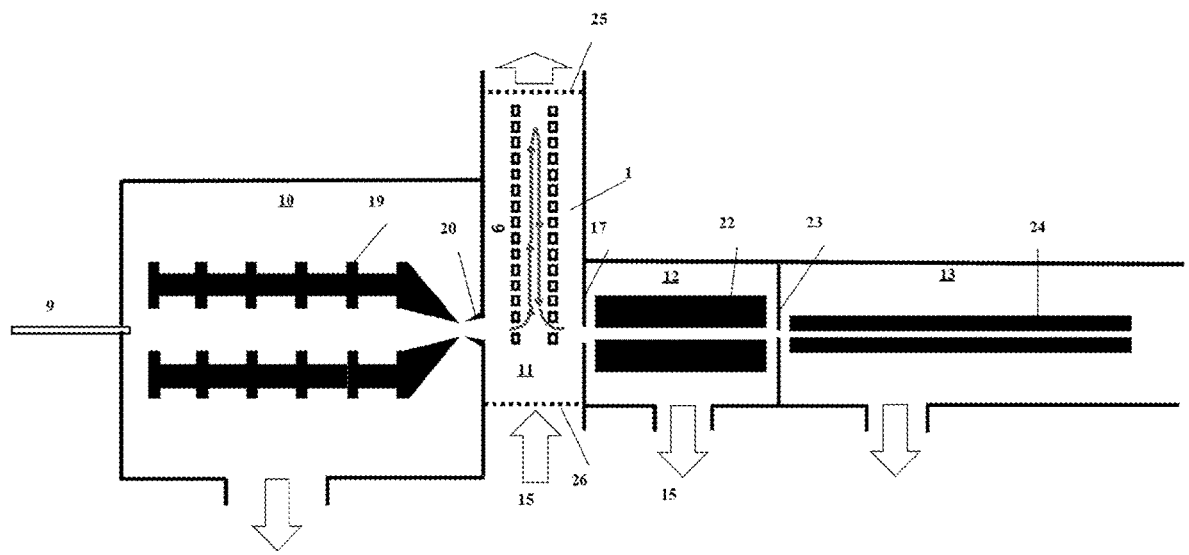
FIG. 3 is a schematic structural diagram showing a relationship between the ion mobility analyzer apparatus and its pre-stage and post-stage vacuum apparatus consistent with the present invention.

FIG. 3 is a schematic diagram of an ion mobility analysis system comprising the ion mobility analyzer apparatus 1 and its pre-stage vacuum apparatus as well as post-stage vacuum apparatus in an embodiment of the present invention. One mass spectrometer has multiple stages of vacuum apparatuses from the atmosphere of the ion source to $10^{-6}$ Torr high vacuum of the mass analyzer. Ions are generated from the ion source and enter a first-stage vacuum apparatus 10 through a capillary 9. The ions in the first-stage vacuum apparatus 10 are focused by a radio frequency ion guiding apparatus 19, and then enter a second-stage vacuum apparatus 11 through a skimmer 20. The ion mobility analyzer apparatus 1 of the present invention is disposed in the second-stage vacuum apparatus 11. The pressure of the second-stage vacuum apparatus 11 is from 2 to 4 Torr. The ions enter a third-stage vacuum apparatus 12 after passing through the ion mobility analyzer apparatus 1. A second ion guiding apparatus 22 is disposed in the third-stage vacuum apparatus 12. The third-stage vacuum apparatus is followed by a fourth-stage vacuum apparatus 13 where a mass analyzer 24 is located. The mass analyzer can be a triple quadrupole mass analyzer or a Q-TOF mass analyzer. Vacuum apparatuses of adjacent stages are connected by orifices 17 and 23. The vacuum apparatus of each stage can be connected to a pump port to maintain vacuum. The second-stage vacuum apparatus 11 where the ion mobility analyzer apparatus is located comprises a gas introducing apparatus 15 to introduce pure mobility analysis buffer gas. In addition, gas flow shape structure 25 and 26 are further disposed at an apparatus entrance and an apparatus exit of the second-stage vacuum apparatus 11, so that the gas flow in the ion mobility analyzer apparatus is a laminar flow. It can be seen from the figure that ion injection and ion ejection perpendicular to an axial direction of ion transfer of the whole system (refer to ion transfer directions of 19, 22, and 24). Therefore, the ion mobility analyzer apparatus of the present invention can introduce pure buffer gas to measure the ion mobility accurately. In addition, the direction and velocity of the gas flow can be changed conveniently.

Figure 4A:
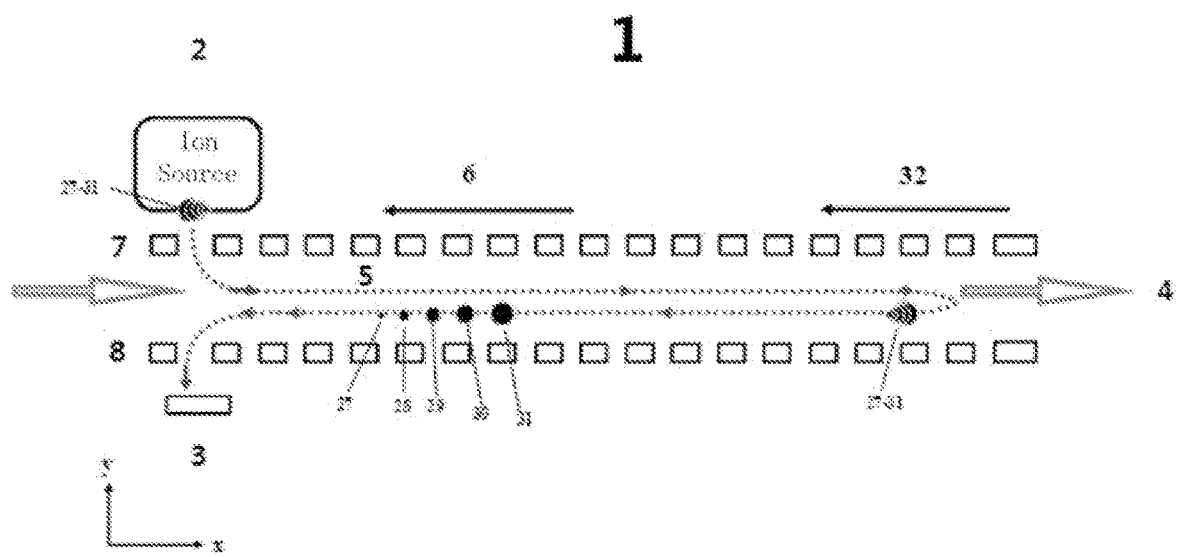
FIG. 4A is a schematic structural diagram of a first embodiment of the ion mobility analyzer apparatus consistent with the present invention.
Figure 4B:
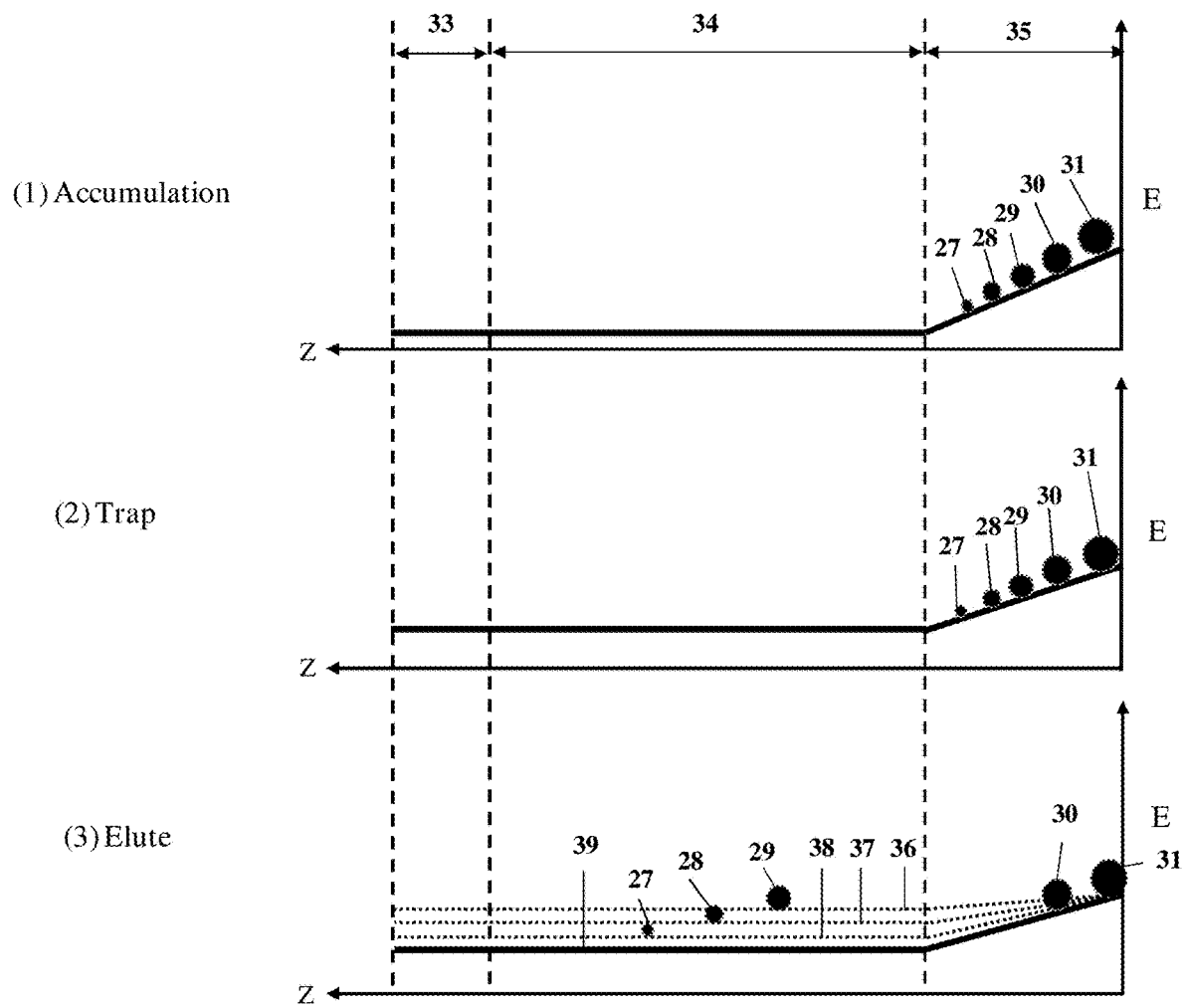
FIG. 4B is an electric field distribution diagram of analysis steps in the first embodiment of the ion mobility analyzer apparatus consistent with the present invention.
Figure 4C:
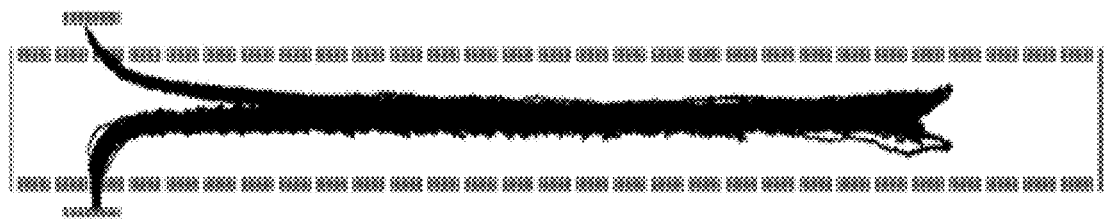
FIG. 4C is an ion trajectory simulation diagram of the first embodiment of the ion mobility analyzer apparatus consistent with the present invention, wherein simulation conditions are m/z: 720, 4 Torr $N_2$, an initial electric field intensity of 8.5 V/mm, and a scanning speed of $1\times10^{-4}$ V/mm·us.

FIG. 4A to FIG. 4C are a series of schematic diagrams of a first embodiment of the ion mobility analyzer apparatus provided in the present invention.

Figure 4D:
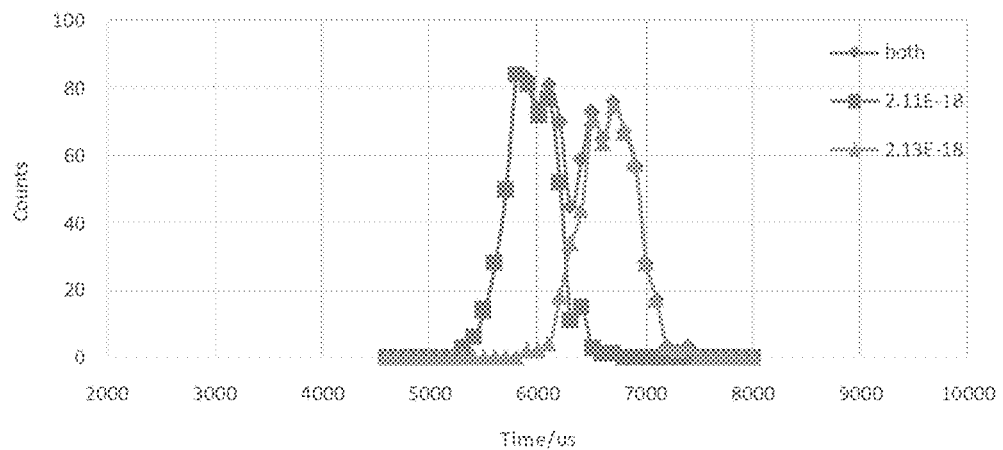
FIG. 4D is a simulated spectrum of the first embodiment of the ion mobility analyzer apparatus consistent with the present invention.

FIG. 4A is a schematic structural diagram of a first embodiment of the ion mobility analyzer apparatus of the present invention. In this embodiment, the ion source 2 and the detector 3 are located at the same end of the drift region and are located upstream of the gas flow. Ions are transferred from the ion source 2 to the other end of the drift region under the effect of the gas flow. Ions with different mobilities achieve equilibrium at different positions under the combined effect of the electric field and the gas flow. After a fixed period of time, the electric field scans with time, and ions with different mobilities pass through the drift region reversely to the detector in different drift times. In this embodiment, the ion mobility analyzer apparatus has three analysis steps: Accumulation, Trap and Elute. Electric field distributions of the three analysis steps are shown in FIG. 4B. In this embodiment, the drift region has three areas: an ion injection and extraction area 33, an ion transfer and analysis area 34, and a nonlinear electric field gradient trap area 35. Ions are first continuously introduced into the drift region, and an electric field with small or zero electric field is applied on the electrode assemblies 7 and 8, so that all ions pass through the ion injection area 33 and the transfer area 34 to enter the nonlinear electric field gradient trap area 35 under the effect of the gas flow. Direct current voltages are applied on the electrode assemblies 7 and 8 to form a nonlinear direct current electric field that applies an opposing force on ions against the gas flow, the acting direction of the nonlinear direct current electric field is indicated by 32, so that ions 27 to 31 with different ion mobilities K1 to K5 (K1>K2>K3>K4>K5) achieve equilibrium with the gas flow at positions with different electric field in this area. The equilibrium condition is KE=U. Assuming that the gas flow velocity U is a constant, ions with a high mobility will achieve equilibrium at a position with a low electric field. After a period of accumulation time, an ions gate at the ion source is closed, ions cannot enter the drift region. Ions will be trapped and cooled by collisions in the nonlinear electric field gradient trap area 35. After a period of time, the electric field of the nonlinear electric field gradient trap area 35 and the transfer area 34 slowly increases from an initial value $E_0$ at a particular speed β (the electric field increases gradually as indicated by 39 to 36). With the electric field intensity increasing, ions with a higher mobility will first pass through the drift region to the detector 3. FIG. 4C is an ion trajectory simulation diagram of this embodiment. FIG. 4D shows simulated spectrum of ions whose mass-to-charge ratios are 720 and collision cross sections are 2.11e-18 $nm^2$ and 2.13e-18 $nm^2$ respectively. It can be seen from the figure that the resolution is approximately 150, and the drift time is 5 to 7 ms.

Figure 5A:
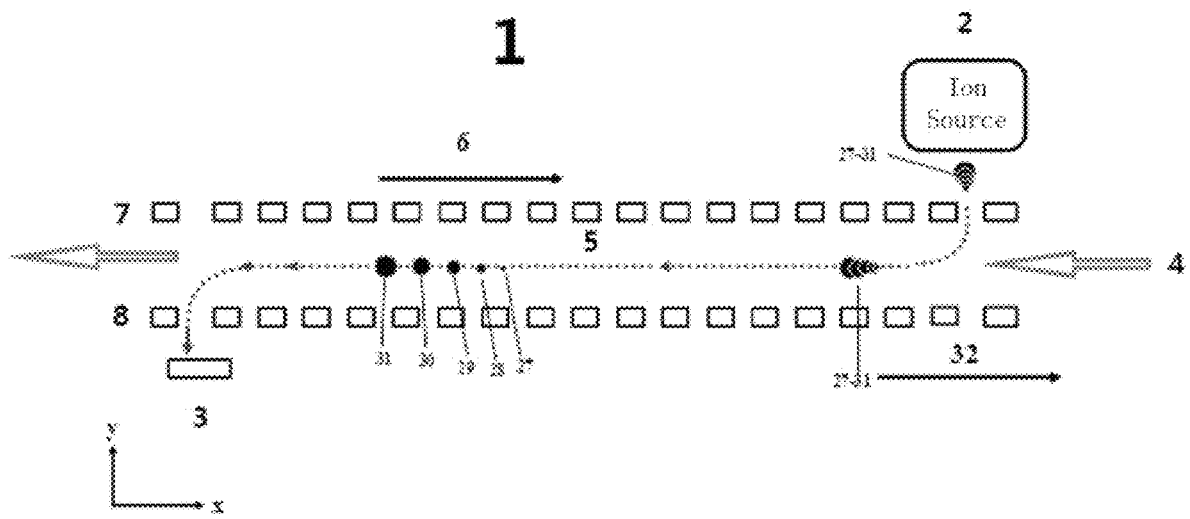
FIG. 5A is a schematic structural diagram of a second embodiment of the ion mobility analyzer apparatus consistent with the present invention.
Figure 5B:
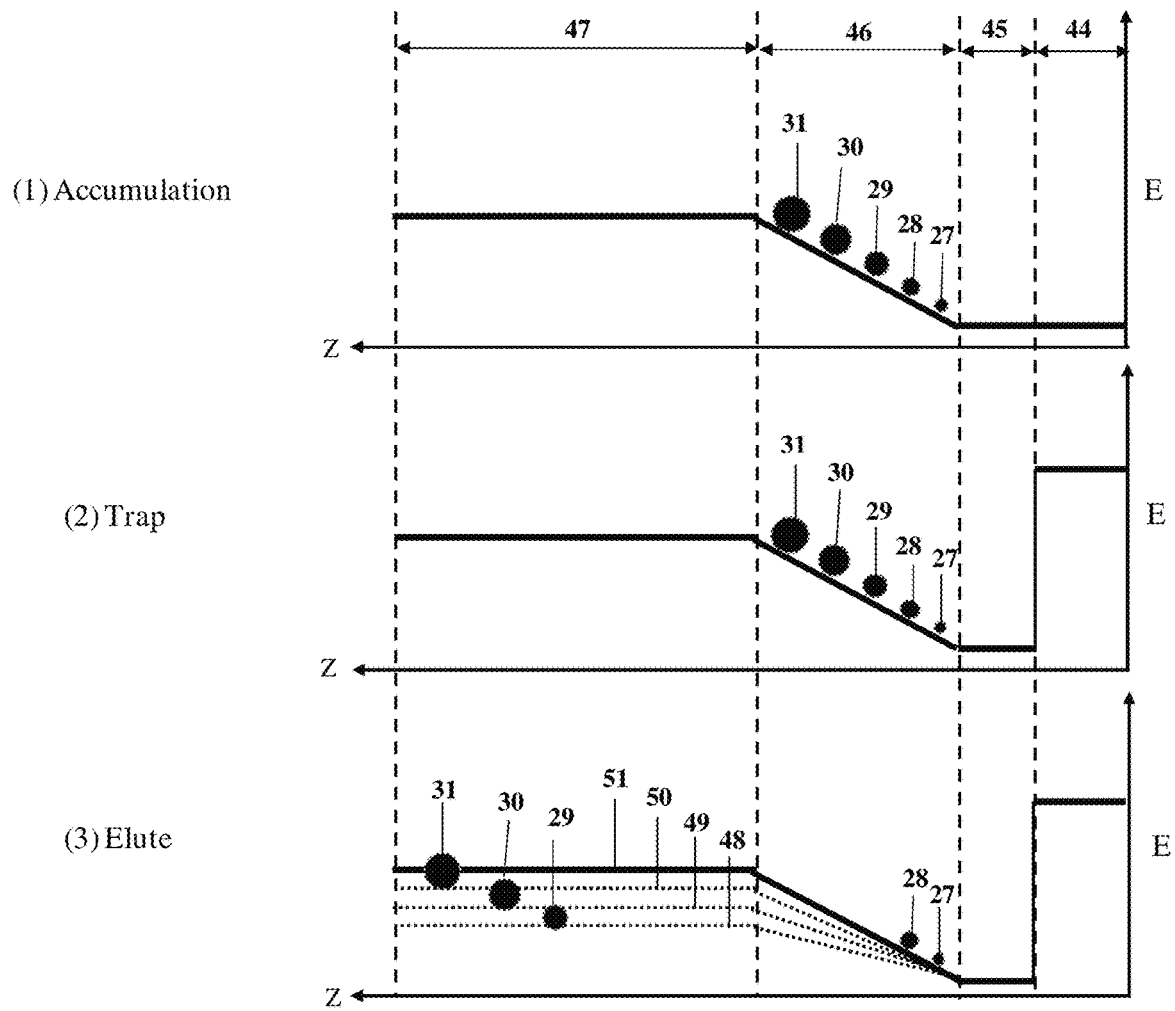
FIG. 5B is an electric field distribution diagram of analysis steps in the second embodiment of the ion mobility analyzer apparatus consistent with the present invention.
Figure 5C:
FIG. 5C is an ion trajectory simulation diagram of the second embodiment of the ion mobility analyzer apparatus consistent with the present invention, wherein simulation conditions are m/z: 720, 4 Torr $N_2$, an initial electric field intensity of 9 V/mm, and a scanning speed of $1\times10^{-4}$ V/mm·us.
Figure 5D:
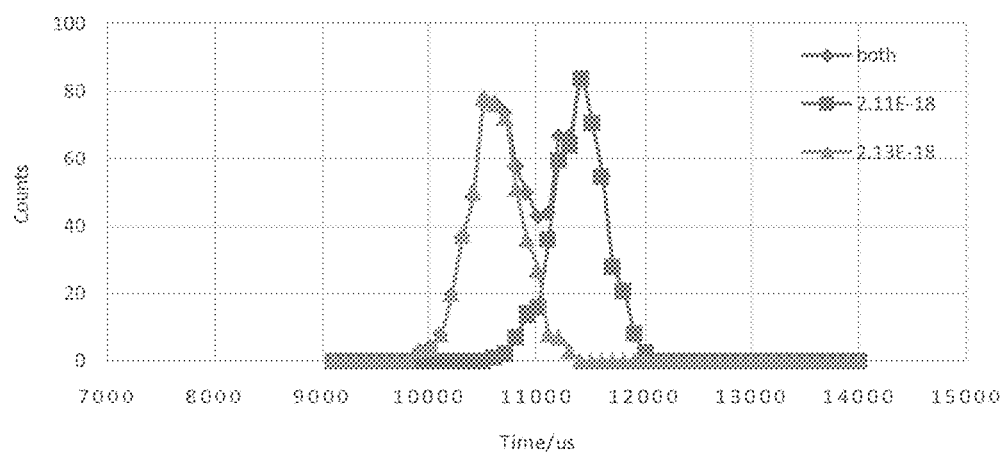
FIG. 5D is a simulated spectrum of the second embodiment of the ion mobility analyzer apparatus consistent with the present invention.

FIG. 5A is a schematic diagram of a second embodiment of the ion mobility analyzer apparatus consistent with the present invention. In this embodiment, the ion source 2 and the detector 3 are respectively located at two ends of the drift region. The ion source 2 is located upstream of the gas flow, and the detector 3 is located downstream of the gas flow. Ions are introduced into the drift region from the ion source 2, and are trapped at different positions in the drift region depending on mobilities of the ions. After a fixed period of time, the electric field scans with time, and ions with different mobilities pass through the drift region to the detector in different drift times. This embodiment comprises three analysis steps: Accumulation, Trap and Elute. Electric field distributions of the three analysis steps are shown in FIG. 5B. In this embodiment, the drift region comprises four areas: an ion analysis area 47, a nonlinear electric field trap area 46, an ion transfer area 45, and an ion injection area 44. During the accumulation, ions are continuously introduced into the drift region. An electric field with small or zero intensity exists in the areas 45 and 44, and all ions are driven by the gas flow to enter the trap area 46 through the areas 45 and 44. In the trap area 46, direct current voltages are applied on the electrode assemblies 7 and 8 to form a nonlinear direct current electric field that applies an opposing force on ions against the gas flow, the direction of the nonlinear direct current electric field is indicated by 32. Ions 27 to 31 with different ion mobilities K1 to K5 (K1>K2>K3>K4>K5) achieve equilibrium with the gas flow at positions with different electric field in this area. After a period of accumulation time, the electric field of the ion injection area 44 is increased, and no ion can enter the drift region. Ions will be trapped and cooled by collisions in the nonlinear electric field trap area 46. In the elute step, the electric field of the nonlinear electric field trap area 46 and the ion analysis area 47 slowly decreases from an initial value $E_0$ at a particular speed β (the electric field intensity decreases gradually as indicated by 51 to 48). With the electric field intensity decreasing, ions with a lower mobility first pass through the drift region to the detector. FIG. 5C is an ion trajectory simulation diagram of this embodiment. FIG. 5D shows simulated spectrum of ions whose mass-to-charge ratios are 720 and collision cross sections are 2.11e-18 $nm^2$ and 2.13e-18 $nm^2$ respectively. It can be seen from the figure that the resolution is approximately 150, and the drift time is 10 to 12 ms.

Figure 6A:
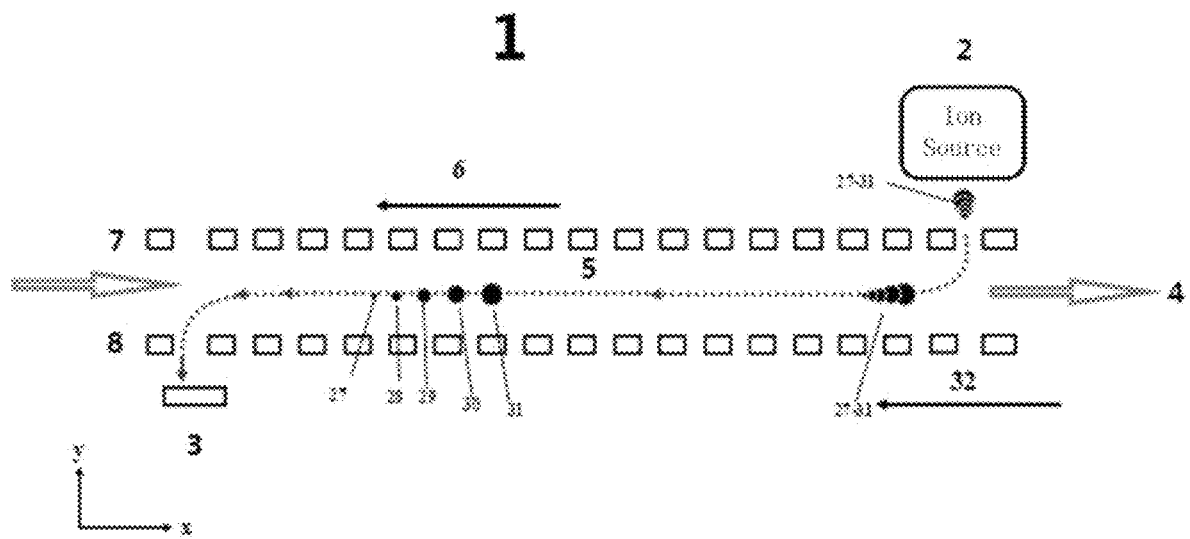
FIG. 6A is a schematic structural diagram of a third embodiment of the ion mobility analyzer apparatus consistent with the present invention.
Figure 6B:
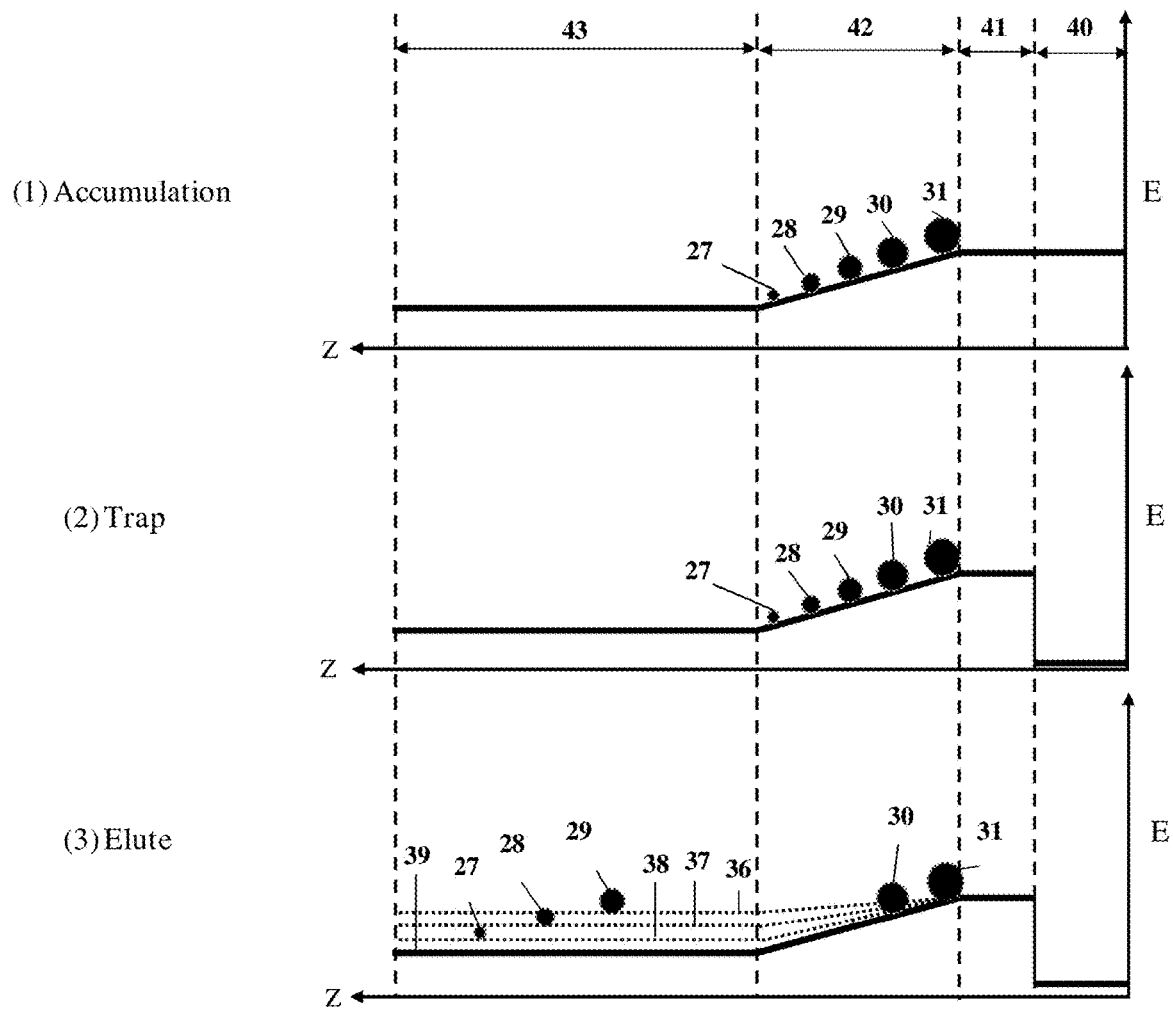
FIG. 6B is an electric field distribution diagram of analysis steps in the third embodiment of the ion mobility analyzer apparatus consistent with the present invention.
Figure 6C:
FIG. 6C is an ion trajectory simulation diagram of the third embodiment of the ion mobility analyzer apparatus consistent with the present invention, wherein simulation conditions are m/z: 720, 4 Torr $N_2$, an initial electric field intensity of 8.5 V/mm, and a scanning speed of $1\times10^{-4}$ V/mm·us.
Figure 6D:
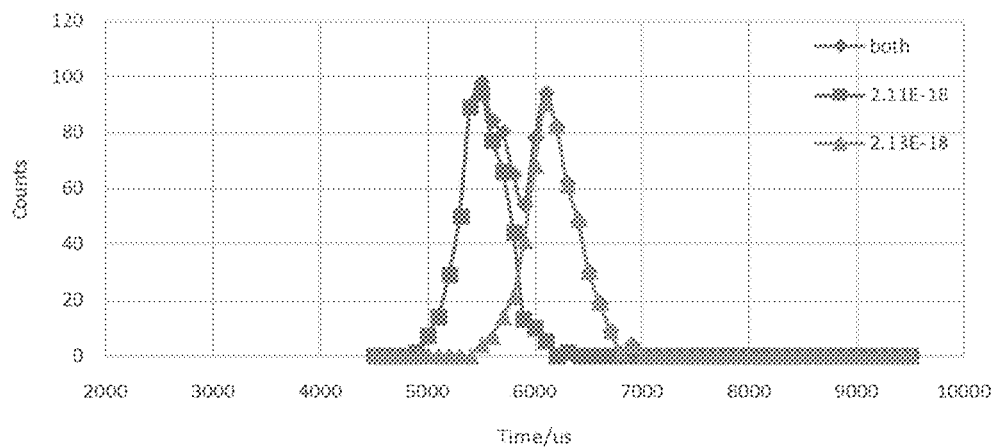
FIG. 6D is a simulated spectrum of the third embodiment of the ion mobility analyzer apparatus consistent with the present invention.

FIG. 6A is a schematic diagram of a third embodiment of the ion mobility analyzer apparatus consistent with the present invention. In this embodiment, the direction of the gas flow 4 is opposite to that of the gas flow in the second embodiment. The ion source 2 is located downstream of the gas flow, and the detector 3 is located upstream of the gas flow. Ions are introduced into the drift region from the ion source 2, and are trapped at different positions in the drift region depending on mobilities of the ions. After a fixed period of time, the electric field scans with time, and ions with different mobilities pass through the drift region to the detector in different drift times. This embodiment comprises three analysis steps: Accumulation, Trap and Elute. Electric field distributions of the three analysis steps are shown in FIG. 6B. In this embodiment, the drift region comprises four areas: an ion analysis area 43, a nonlinear electric field trap area 42, an ion transfer area 41, and an ion injection area 40. During the accumulation, ions are continuously introduced into the drift region. A high electric field is applied in the areas 41 and 40, and all ions enter the trap area 42 through the two areas. In the trap area 42, direct current voltages are applied on the electrode assemblies 7 and 8 to form a nonlinear direct current electric field that applies an opposing force on ions against the gas flow, the acting direction of the nonlinear direct current electric field on the ions is indicated by 32. Ions 27 to 31 with different ion mobilities K1 to K5 (K1>K2>K3>K4>K5) achieve equilibrium with the gas flow at positions with different electric field in this area. After a period of accumulation time, the electric field of the ion injection area 40 is decreased, and no ion can enter the drift region. Ions will be trapped and cooled by collisions in the nonlinear electric field trap area 42. In the elute step, the electric field of the nonlinear electric field trap area 42 and the ion analysis area 43 slowly increases from an initial value $E_0$ at a particular speed β (the electric field intensity increases gradually as indicated by 36 to 39). With the electric field intensity increasing, ions with a higher mobility will first pass through the drift region to the detector. FIG. 6C is an ion trajectory simulation diagram of this embodiment. FIG. 6D shows simulated spectrum of ions whose mass-to-charge ratios are 720 and collision cross sections are 2.11e-18 $nm^2$ and 2.13e-18 $nm^2$ respectively. It can be seen from the figure that the resolution is approximately 150, and the drift time is 5 to 7 ms.

Figure 7A:
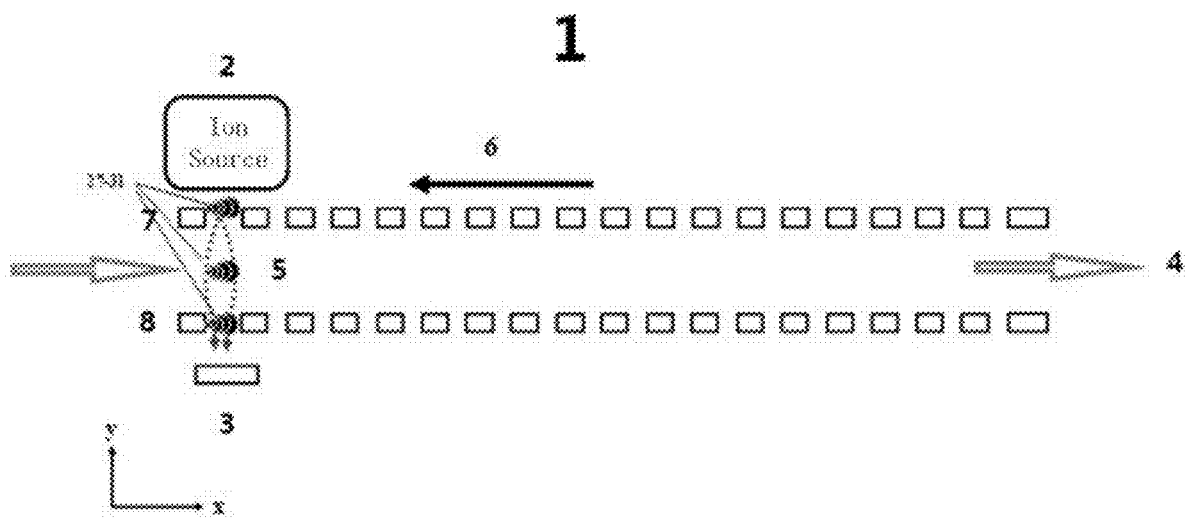
FIG. 7A is a schematic structural diagram of a fourth embodiment of the ion mobility analyzer apparatus consistent with the present invention.
Figure 7B:
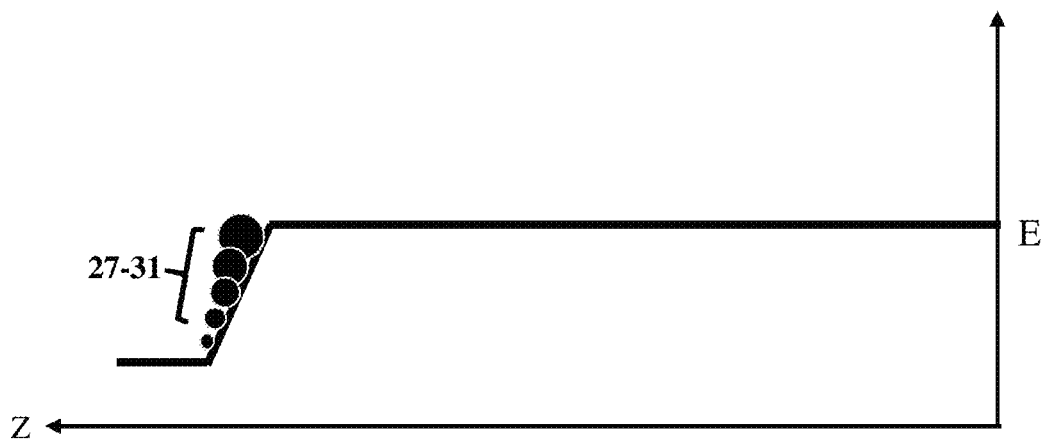
FIG. 7B is an electric field distribution diagram of analysis steps in the fourth embodiment of the ion mobility analyzer apparatus consistent with the present invention.
Figure 7C:
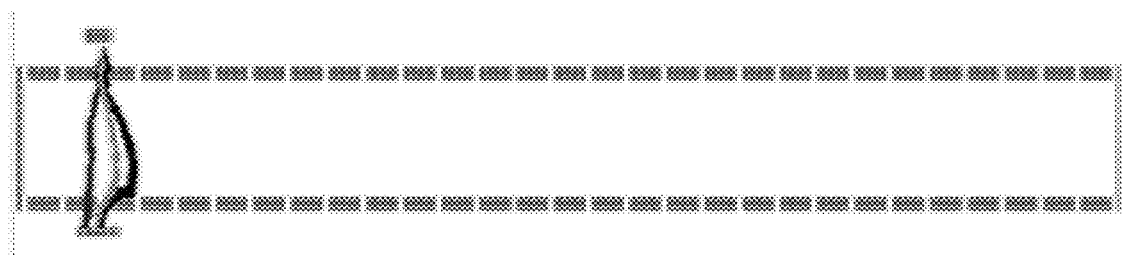
FIG. 7C is a simulated spectrum of the fourth embodiment of the ion mobility analyzer apparatus consistent with the present invention.

FIG. 7A is a schematic diagram of a fourth embodiment of the ion mobility analyzer apparatus consistent with the present invention. In this embodiment, the ion source and the detector are located at the same end of the drift region, and all ions are transferred from the ion source to the detector along a direction perpendicular to the direction of the gas flow. A nonlinear electric field whose direction is opposite to the direction of the gas flow is applied on the parallel electrode assemblies 7 and 8, and all ions 27 to 31 are confined near an axis, which is perpendicular to the direction of the gas flow, from the ion source to the detector. A direct current gradient perpendicular to the direction of the gas flow is added on the parallel electrode assemblies 7 and 8 simultaneously, pushing all ions from the ion source to the detector along the direction perpendicular to the direction of the gas flow. The electric field distribution is shown in FIG. 7B. FIG. 7C is an ion trajectory simulation diagram of this embodiment. The ion transfer efficiency is close to 100%, and the transfer time is also very short (about 100 us).

In conclusion, the present invention provides an ion mobility analyzer apparatus and analysis method. The analyzer apparatus comprises: an ion source; two groups of parallel electrodes, wherein a drift region is formed between the two groups of parallel electrodes, the drift region has an ion entrance and an ion exit, the ion entrance is connected to the ion source; wherein each of the two groups of parallel electrodes is located in a plane respectively, the two planes are parallel to each other, and a gas flow exists in the drift region, the gas flow is a laminar flow; a power supply unit, configured to apply direct current voltage on the two groups of parallel electrodes to form a direct current electric field that applies an opposing force on ions against the gas flow so that ions with different mobilities are trapped under the combined effect of the gas flow and the direct current electric field, wherein the power supply unit scans the direct current electric field to separate ions with different mobilities in the drift region, and the power supply unit adds radio frequency voltages on the parallel electrodes to confine ions in a direction perpendicular to the direction of the gas flow; and a detector connected to the ion exit to detect ions. The analyzer apparatus consistent with the present invention achieves high sensitivity and ion utilization, and can measure ion mobility accurately.

The above-mentioned embodiments are just used for exemplarily describing the principle and effects of the present invention instead of limiting the present invention. One skilled in the art can make modifications or changes to the above-mentioned embodiments without going against the spirit and the range of the present invention. Therefore, all equivalent modifications or changes made by those who have common knowledge in the art without departing from the spirit and technical concept disclosed by the present invention shall be still covered by the claims of the present invention.

What is claimed is:

1. An ion mobility analyzer apparatus for separating and identifying ionic analytes, comprising:
    an ion source;
    two groups of parallel electrodes, wherein a drift region is formed between the two groups of parallel electrodes, the drift region has an ion entrance and an ion exit, and the ion entrance is connected to the ion source; wherein each of the two groups of parallel electrodes is located in a plane respectively, the two planes are parallel to each other, and a gas flow exists in the drift region between the two groups of parallel electrodes, the gas flow is a laminar flow;
    a power supply unit, configured to apply direct current voltage on the two groups of parallel electrodes to form a direct current electric field that applies an opposing force on ions against the gas flow, so that ions with different mobilities are trapped under the combined effect of the gas flow and the direct current electric field, wherein the power supply unit scans the direct current electric field to separate ions with different mobilities in the drift region; and the power supply unit adds radio frequency voltages on the parallel electrodes to confine ions in a direction perpendicular to the direction of the gas flow; and a detector connected to the ion exit to receive and detect ions, wherein a direction of ion injection is perpendicular to a direction of gas flow; and a direction of ion ejection is perpendicular to the direction of gas flow; and wherein the ion source and the detector are located on two sides of a particular position in the gas flow, the two sides correspond to the two groups of parallel electrodes respectively.

2. The ion mobility analyzer apparatus as in claim 1, wherein each group of parallel electrodes comprises a series of parallel strip electrodes, a direction of the strip electrodes is perpendicular to the direction of the gas flow, and radio frequency voltages with different phases are applied on adjacent strip electrodes to form, in the direction perpendicular to the direction of the gas flow, a quadrupole field array or multipole field array for confining ions.

3. The ion mobility analyzer apparatus as in claim 1, wherein each group of parallel electrodes comprises a series of parallel strip electrodes, a direction of the strip electrodes is parallel to the direction of the gas flow, and radio frequency voltages with different phases are applied on adjacent strip electrodes to form, in a direction parallel to the gas flow, a quadrupole field array or multipole field array for confining ions.

4. The ion mobility analyzer apparatus as in claim 1, wherein a preset-length segment close to the ion exit of the drift region is provided with a series of electrodes, and radio frequency voltages are applied on the series of electrodes in the preset-length segment to form a focusing electric field to confine ions, focus ions, and transfer ions to the detector.

5. The ion mobility analyzer apparatus as in claim 1, wherein a mass spectrometer is provided in a pre-stage and/or a post-stage of the drift region to form a mobility and mass-to-charge ratio hybrid analyzer with the ion mobility analysis apparatus.

6. The ion mobility analyzer apparatus as in claim 1, wherein the power supply unit applies a nonlinear electric field on a part of electrodes in the drift region which are close to the ion entrance to accumulate ions near the ion source, wherein the nonlinear electric field applies an opposing force on ions against the gas flow.

7. The ion mobility analyzer apparatus as in claim 1, wherein the direct current electric field in the drift region comprises a nonlinear direct current electric field to trap ions with different mobilities; and the power supply unit scans the nonlinear direct current electric field, and the trapped ions with different mobilities pass through the drift region in different periods of drift time to the detector.

8. The ion mobility analyzer apparatus as in claim 1, wherein the direct current electric field in the drift region comprises a nonlinear direct current electric field to transfer all ions from the ion entrance to an end of the drift region and accumulate the ions at the end of the drift region; and the power supply unit scans the nonlinear direct current electric field, and the ions with different mobilities accumulated at the end pass through the drift region in different periods of drift time to the detector.

9. The ion mobility analyzer apparatus as in claim 1, wherein the direct current electric field comprises a nonlinear direct current electric field to confine all ions near an axis, which is perpendicular to the direction of the gas flow, from the ion source to the detector; and the power supply unit applies a direct current gradient perpendicular to the direction of the gas flow on at least part of the two groups of parallel electrodes, and pushes all ions to move from the ion entrance to the ion exit along the direction perpendicular to the direction of the gas flow.

10. The ion mobility analyzer apparatus as in claim 1, wherein velocity of the gas flow in the drift region is scanned, ions with different mobilities pass through the drift region in different periods of drift time to the detector.

11. An analysis method for separating and identifying ionic analytes comprising:

providing an ion source;

providing two groups of parallel electrodes, wherein a drift region is formed between the two groups of parallel electrodes, the drift region has an ion entrance and an ion exit, and the ion entrance is connected to the ions source; wherein each group of the two groups of parallel electrodes is located in a plane respectively, the two planes are parallel to each other, and a gas flow exists in the drift region between the two groups of parallel electrodes, the gas flow is a laminar flow;

providing a power supply unit, which applies direct current voltage on the two groups of parallel electrodes to form a direct current electric field that applies an opposing force on ions against the gas flow, ions with different mobilities are trapped under the combined effect of the gas flow and the direct current electric field, wherein the power supply unit scans the direct current electric field to separate ions with different mobilities in the drift region; and the power supply unit adds radio frequency voltages on the parallel electrodes to confine ions in a direction perpendicular to the direction of the gas flow; and providing a detector connected to the ion exit to receive and detect ions, wherein a direction of ion injection is perpendicular to a direction of gas flow; and a direction of ion ejection is perpendicular to the direction of gas flow; and wherein the ion source and the detector are located on two sides of a particular position in the gas flow, the two sides correspond to the two groups of parallel electrodes respectively.

12. The analysis method as in claim 11, wherein the direct current electric field in the drift region comprises a nonlinear direct current electric field, and the method comprises:

trapping ions with different mobilities by using the nonlinear direct current electric field; and scanning the nonlinear direct current electric field, the trapped ions with different mobilities pass through the drift region in different periods of drift time to the detector.

13. The analysis method as in claim 11, wherein the direct current electric field in the drift region comprises a nonlinear direct current electric field, and the method comprises:

transferring all ions from the ion entrance to an end of the drift region by using the nonlinear direct current electric field, and accumulating the ions at the end of the drift region; and scanning the nonlinear direct current electric field, the accumulated ions with different mobilities pass through the drift region in different periods of drift time to the detector.

14. The analysis method as in claim 11, wherein the direct current electric field comprises a nonlinear direct current electric field, and the method comprises:

confining all ions near an axis, which is perpendicular to the direction of the gas flow, from the ion source to the detector; and applying a direct current gradient perpendicular to the direction of the gas flow on at least part of the two groups of parallel electrodes, pushing all ions to move from the ion entrance to the ion exit along the direction perpendicular to the direction of the gas flow.

15. The analysis method as in claim 11, comprising: scanning velocity of the gas flow in the drift region with time, ions with different mobilities pass through the drift region in different periods of drift time to the detector.

* * * * *